(12) United States Patent
Frank et al.

(10) Patent No.: US 8,437,979 B2
(45) Date of Patent: May 7, 2013

(54) SMART TETHER SYSTEM FOR UNDERWATER NAVIGATION AND CABLE SHAPE MEASUREMENT

(75) Inventors: Jeremy E. Frank, Pine Grove Mills, PA (US); Richard Geiger, Boalsburg, PA (US); David R. Kraige, State College, PA (US); Arun Murali, State College, PA (US)

(73) Assignee: KCF Technologies, Inc., State College, PA (US)

( * ) Notice: Subject to any disclaimer, the term of this patent is extended or adjusted under 35 U.S.C. 154(b) by 848 days.

(21) Appl. No.: 12/017,537

(22) Filed: Jan. 22, 2008

(65) Prior Publication Data

US 2008/0300821 A1 Dec. 4, 2008

Related U.S. Application Data

(60) Provisional application No. 60/885,884, filed on Jan. 20, 2007.

(51) Int. Cl.
*G01B 5/02* (2006.01)

(52) U.S. Cl.
USPC ........................................................ 702/158

(58) Field of Classification Search .................... 702/94, 702/141, 150, 158, 182–185, 188
See application file for complete search history.

(56) References Cited

U.S. PATENT DOCUMENTS

| | | | |
|---|---|---|---|
| 3,942,150 A | 3/1976 | Booth et al. | |
| 4,088,978 A | 5/1978 | Gilmour | |
| 4,119,940 A | 10/1978 | Keating et al. | |
| 4,244,036 A | 1/1981 | Raven | |
| 4,315,263 A | 2/1982 | Neidell | |
| 4,404,664 A * | 9/1983 | Zachariadis | 367/19 |
| 4,420,251 A | 12/1983 | James et al. | |
| 4,454,597 A | 6/1984 | Sullivan | |
| 4,596,007 A | 6/1986 | Grall et al. | |
| 4,733,068 A | 3/1988 | Thiele et al. | |
| 4,800,542 A | 1/1989 | Franklin et al. | |
| 4,953,143 A | 8/1990 | Higgins et al. | |
| 4,958,330 A | 9/1990 | Higgins | |
| 4,980,870 A | 12/1990 | Spivey et al. | |
| 5,029,144 A | 7/1991 | Griffin | |
| 5,117,400 A | 5/1992 | Penn et al. | |

(Continued)

OTHER PUBLICATIONS

Aither Engineering, Inc.; Smart Tether for Relative Localization of Moored and Towed Bodies; www.aitherengineering.com/aither_soft.html ; 2007.

*Primary Examiner* — Edward Raymond
(74) *Attorney, Agent, or Firm* — The Webb Law Firm

(57) ABSTRACT

A position sensing system including a flexible tether and at least one sensor at least partially embedded within a portion of the flexible tether is disclosed. The sensor may be adapted to detect a sensor position factor. The system also includes a communication device adapted to transmit the sensor position factor from the sensor, and a signal processor adapted to receive the sensor position factor. The signal processor is also adapted to calculate at least one of the shape or orientation of the flexible tether from the sensor position factor. The sensor position factor may be relative orientation, relative depth, relative pressure, presence of a magnetic field, presence of an electric field, acceleration, or relative rate of rotation. The system may also include a probe connected to the flexible tether, and the signal processor may calculate the orientation of the probe from the sensor position factor.

18 Claims, 14 Drawing Sheets

U.S. PATENT DOCUMENTS

| | | |
|---|---|---|
| 5,119,341 A | 6/1992 | Youngberg |
| 5,295,118 A | 3/1994 | Gilmour |
| 5,323,362 A | 6/1994 | Mitchell et al. |
| 5,412,618 A | 5/1995 | Gilmour |
| 5,528,554 A | 6/1996 | Posch et al. |
| 5,568,154 A | 10/1996 | Cohen |
| 5,708,626 A | 1/1998 | Hrubes |
| 5,802,012 A | 9/1998 | Yamaguchi |
| 5,886,950 A | 3/1999 | Billon |
| 6,037,892 A | 3/2000 | Nikias et al. |
| 6,058,874 A * | 5/2000 | Glenning et al. .............. 114/328 |
| 6,088,295 A | 7/2000 | Altes |
| 6,215,730 B1 | 4/2001 | Pinto |
| 6,304,513 B1 | 10/2001 | Billon |
| 6,501,704 B2 | 12/2002 | Nishimura |
| 6,594,200 B2 | 7/2003 | Nakamura |
| 6,868,044 B1 | 3/2005 | Barnard |
| 6,888,623 B2 | 5/2005 | Clements |
| 7,046,582 B1 | 5/2006 | Kosalos et al. |
| 7,126,876 B1 | 10/2006 | Rowland et al. |
| 7,190,634 B2 | 3/2007 | Lambert et al. |
| 7,228,236 B2 | 6/2007 | Barnard et al. |
| 7,239,263 B1 | 7/2007 | Sawa |
| 7,242,638 B2 | 7/2007 | Kerfoot et al. |
| 7,257,483 B2 * | 8/2007 | Blain et al. ..................... 701/207 |
| 2004/0002828 A1* | 1/2004 | Swope et al. ................... 702/95 |
| 2005/0249040 A1* | 11/2005 | Luc et al. ....................... 367/178 |

* cited by examiner

SMART TETHER SYSTEM FOR UNDERWATER NAVIGATION AND CABLE SHAPE MEASUREMENT

CROSS REFERENCE TO RELATED APPLICATION

This patent application claims priority to U.S. Provisional Application Ser. No. 60/885,884 filed Jan. 20, 2007, the entire disclosure of which is herein incorporated by reference.

STATEMENT REGARDING FEDERALLY SPONSORED RESEARCH

This invention was made with United States government support under U.S. Navy STTR (SBIR) ONR Award No. N00014-05-C-0359. The government has certain rights in this invention.

BACKGROUND OF THE INVENTION

1. Field of the Invention

The subject invention relates generally to tether positioning systems and tether shape measuring systems and, more particularly, to tether shape measuring systems used for underwater navigation or localization.

2. Description of Related Art

United States Navy and commercial ships face a variety of distributed and challenging threats to the security of both personnel and assets. One such threat is explosive magnetic limpet mines which are attachable to ship hulls, propellers or rudders. In order to minimize this threat, in-water inspections of ships for both maintenance purposes and damage assessment are necessitated. Rapid-response inspections for ship hull mines address the rising need for security, but effective inspections require accurate positioning information to ensure that the entire hull has been thoroughly searched. Effective inspections also require the localization of specific positions on the hull for documentation or a return to the site.

Advanced technologies are emerging for hull inspection and neutralization. However, a major challenge with these advanced systems is navigation during a hull search. Another challenge is the recording of the specific location of an identified threat. Present remotely operated vehicle (ROV) navigation systems are acoustic-based and are difficult to use and have significant performance shortfalls. Such systems typically exhibit poor deployment time, refresh rate, robustness to acoustic harbor noise, and dependability.

In these and other United States Navy applications, an improved method is needed to measure the relative location of a tethered underwater ROV or unmanned undersea vehicle (UUV). Specifically, a need exists for an improved device and method to measuring the relative location of a tethered ROV or UUV for performing ship hull inspections.

SUMMARY OF THE INVENTION

The present invention is directed to a system for improved localization of tethered underwater bodies.

In one embodiment of the present invention, a position sensing system includes a flexible tether with at least one sensor at least partially embedded within a portion of the flexible tether. The sensor is adapted to detect a sensor position factor. The system also includes a communication device adapted to transmit the sensor position factor from the sensor, as well as a signal processor adapted to receive the sensor position factor. The signal processor is capable of calculating at least one of the shape or orientation of the flexible tether from the sensor position factor.

Optionally, a plurality of sensors may be embedded at least partially within the flexible tether, with each sensor adapted to detect a sensor position factor. The sensors may be spaced apart from one another within the flexible tether. The sensor position factor may be relative orientation, relative depth, relative pressure, presence of a magnetic field, presence of an electric field, acceleration, or relative rate of rotation. Each sensor may detect the same sensor position factor or a different sensor position factor. The sensors may be accelerometers, pressure sensors, magnetometers, or gyroscopic angular rate sensors. The sensor may be housed at least partially within a node having at least one flexible coupling section.

The communication device may optionally transmit the sensor position factor along the flexible tether. In one configuration, the system may include a probe connected to at least a portion of the flexible tether. The signal processor may utilize at least one of the shape or orientation of the flexible tether to navigate or locate the probe. The probe may be a remotely operated vehicle, an unmanned underwater vehicle, a human underwater diver, an autonomous underwater vehicle, or a submerged crawling vehicle. A first end of the flexible tether may be connected to an analysis platform located above water, and a second end of the flexible tether may be connected to the probe or equipment related to the probe located underwater.

In another embodiment of the present invention, a position sensing system includes a flexible tether, and at least one sensor at least partially embedded within a portion of the flexible tether. The sensor may be adapted to detect a sensor position factor. The system also includes a communication device adapted to transmit the sensor position factor from the sensor, such that the sensor position factor is capable of indicating at least one of the shape or orientation of the flexible tether.

The system may include a plurality of sensors embedded at least partially within the flexible tether. Each sensor may be adapted to detect a sensor position factor. The sensor position factor may be relative orientation, relative depth, relative pressure, presence of a magnetic field, presence of an electric field, acceleration, or relative rate of rotation. The sensor may be an accelerometer, a pressure sensor, a magnetometer, or a gyroscopic angular rate sensor.

The system may further include a probe connected to at least a portion of the flexible tether, such that the sensor position factor determines the location of the probe. The probe may be a remotely operated vehicle, an unmanned underwater vehicle, a human underwater diver, an autonomous underwater vehicle, or a submerged crawling vehicle.

In another embodiment of the present invention, a method for navigating or locating a probe includes the step of providing a flexible tether having at least one sensor at least partially embedded within a portion of the flexible tether. The sensor may be adapted to detect a sensor position factor. The method also includes the steps of detecting a sensor position factor, and communicating the detected sensor position factor to a signal processor. The method may also include the step of calculating at least one of the shape or orientation of the flexible tether from the detected position factor.

A probe may be connected to the flexible tether, and the step of calculating at least one of the shape or orientation of the flexible tether from the detected position factor may include calculating the orientation of the probe. The probe may be a remotely operated vehicle, an unmanned underwater vehicle, a human underwater diver, an autonomous underwater vehicle, or a submerged crawling vehicle.

In yet another embodiment of the present invention, a computer readable medium has stored instructions thereon which, when executed by a processor, causes the processor to calculate at least one of the shape or orientation of a flexible tether. The shape or orientation of the flexible tether is calculated from at least one sensor position factor detected by a sensor embedded within the flexible tether.

In one configuration, the shape or orientation of the flexible tether is determined by sensor position factors received from two adjacent sensors embedded within the flexible tether. In another configuration, the shape or orientation of the flexible tether is determined by multiple sensor position factors received from multiple sensors embedded within the flexible tether.

The present invention, along with the attributes and attendant advantages thereof, may be further appreciated in view of the following detailed description and accompanying drawings.

DETAILED DESCRIPTION OF THE EMBODIMENTS

For purposes of the description hereinafter, the words "upper", "lower", "right", "left", "vertical", "horizontal", "top", "bottom", "lateral", "longitudinal" and like spatial terms, if used, shall relate to the described embodiments as oriented in the figures. However, it is to be understood that many alternative variations and embodiments may be assumed except where expressly specified to the contrary. It is also to be understood that the specific devices and embodiments illustrated in the accompanying drawings and described herein are simply exemplary embodiments of the invention.

Figure 1:
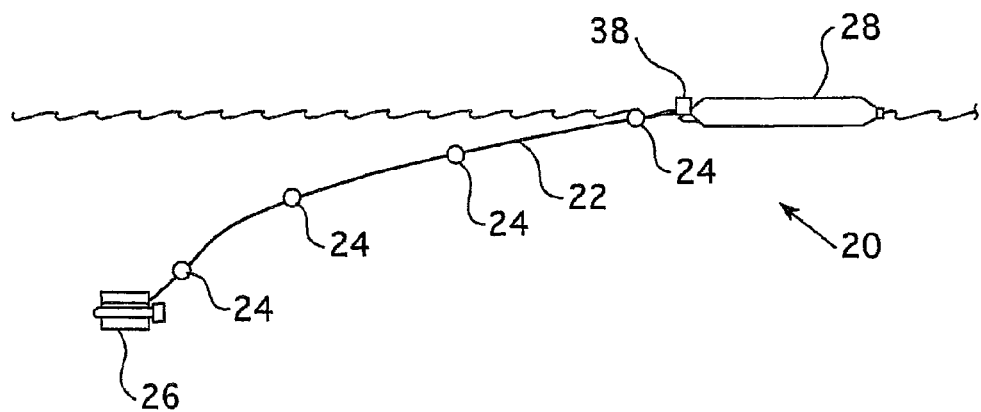
FIG. 1 is a schematic representation of a position sensing system including a probe, a flexible tether, a plurality of sensors embedded within the sensor, and an analysis platform in accordance with an embodiment of the present invention.

Referring to FIG. 1, the present invention is directed to a position sensing system 20, including a flexible tether 22 and at least one sensor 24 embedded within a portion of the flexible tether 22. The flexible tether 22 having at least one sensor 24 embedded therein may be disposed between a probe 26 and an analysis platform 28. The system of the present invention has particular utility for underwater navigation and/or localization applications. For example, the position sensing system 20 may be used for underwater tether shape measurements and for the localization of underwater probes utilized in underwater equipment inspections, search and recovery operations, and ship hull and harbor searches for homeland security applications.

In one embodiment, the position sensing system 20 may be used for determining the overall shape of the flexible tether 22. Referring again to FIG. 1, the flexible tether 22 may be made out of any sufficiently flexible material to allow movement between the probe 26 and the analysis platform 28. In one embodiment, the flexible tether 22 has sufficient flexibility to be wound on a winch, such as a winch having a radius of approximately six inches. Example materials the flexible tether 22 may be constructed from include multi-conductor copper wire optionally including a Kevlar strength member, waterproof sheath, and/or foam flotation jacket, fiber-optic tether materials having a strength member and waterproof sheath, general data wire with multiple conductors, a pressurized air line for human divers, and combinations thereof. In certain embodiments, the flexible tether 22 is constructed from a substantially waterproof material and/or is coated with a substantially waterproof coating. In one configuration, as shown in FIG. 2, the flexible tether 22 may be substantially hollow and/or form a conduit 36 extending substantially along the longitudinal axis A of the flexible tether 22.

The flexible tether 22 may have any suitable dimensions for the particular suited application. For example, as shown in FIG. 2A, if the position sensing system 20 shown in FIG. 1, is utilized for underwater equipment inspections, search and recovery operations, ship hull searches or harbor searches, the flexible tether 22 may have a length L of from about 20 feet to about 1000 feet, and a diameter D of from about 0.25 inch to about 1.5 inches. In another embodiment, the flexible tether 22 may include a plurality of segmented sections 22A separated by a plurality of sensors 24 embedded within the flexible tether 22. As used herein, the term "embedded within" means at least a portion of the sensor 24 is directly or indirectly physically connected to at least a portion of the segmented section 22A of the flexible tether 22. The flexible tether 22 may include a single sensor 24, a plurality of sensors 24 located at approximately the same physical location within the flexible tether 22, or a plurality of sensors 24 spaced apart from one another within the flexible tether 22. In certain embodiments, the length $L_1$ of the segmented sections 22A separating the sensors 24 embedded within the flexible tether 22 may be from about 15 feet to about 30 feet. In another configuration, the sensors 24 are embedded within the flexible tether 22 and spaced apart from one another by varying lengths of segmented sections 22A.

Figure 2:
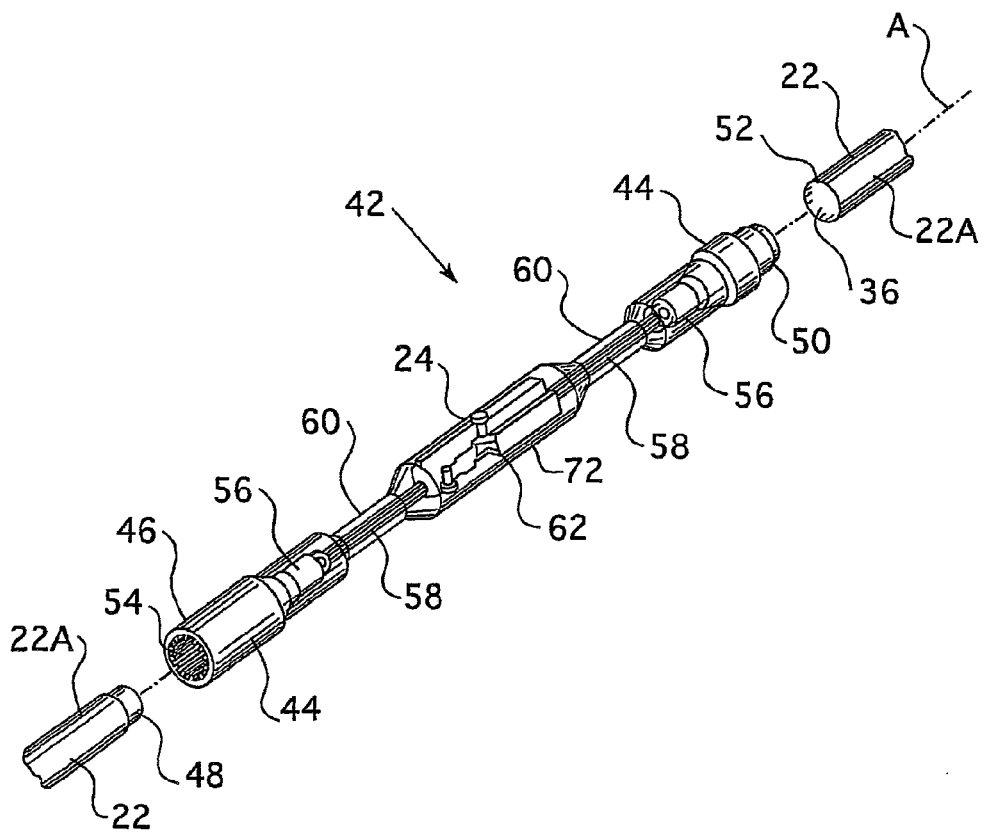
FIG. 2 is a perspective view of a sensor unit in accordance with an embodiment of the present invention.
Figure 2A:
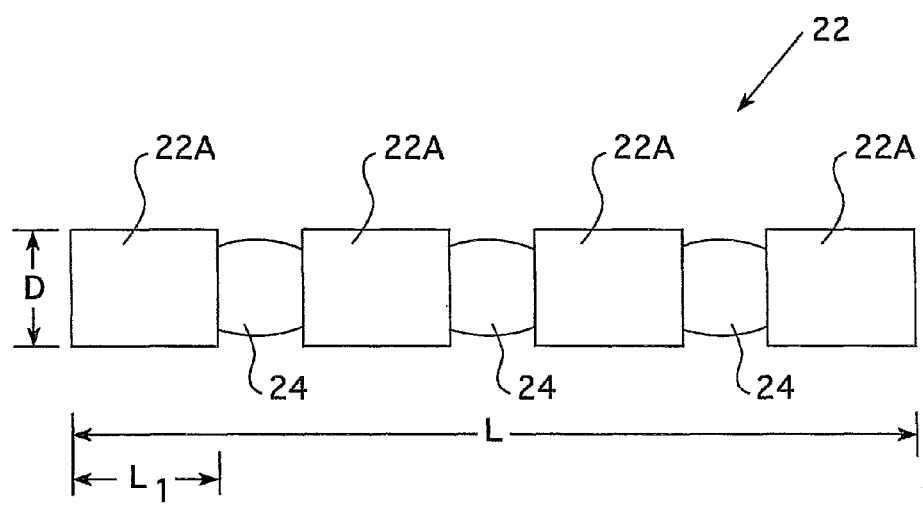
FIG. 2A is a schematic representation of a flexible tether including flexible tether segments separated by sensors in accordance with an embodiment of the present invention.

As shown in FIG. 2, a sensor 24 of the present invention is embedded within the flexible tether 22, such as between two adjacent segmented sections 22A. The sensor 24 is adapted to detect a sensor position factor. As used herein, the term "sensor position factor" means at least one spatial and/or orientation and/or temporal data reference experienced by the sensor. In one embodiment, the sensor 24 is at least one of an accelerometer, pressure sensor, magnetometer, or gyroscopic angular rate sensor. Example accelerometers include tri-axial +/−3 g integrated micro-electro mechanical system (iMEMS) accelerometers such as model ADXL330 commercially available from Analog Devices with a typical sensitivity of 300 mV/g. Example pressure sensors include miniature strain measurement device (SMD) pressure sensors such as model MS5412BM commercially available from Intersema with a full-scale range of 12 bar. Example magnetometers include tri-axial magnetic sensors, such as model HMC1053 commercially available from Honeywell with a sensitivity of 1 mv/V/gauss. Example angular rate sensors include gyroscopic angular rate sensors such as the integrated dual-axis gyro model IDG-300 commercially available from InvenSense with a sensitivity of 2.0 mV/degrees/second. In another embodiment, the sensor position factor is at least one of relative orientation, depth, relative pressure, orientation of a magnetic field, orientation of an electric field, acceleration, velocity, proximity, force, curvature or relative rate of rotation. In one embodiment, the sensors 24 may be commercially available sensors fabricated with MEMS techniques having significantly reduced power consumption as compared to acoustic systems with transponders and receivers.

Referring again to FIG. 2, in one embodiment, the sensor 24 is housed at least partially within a node 42 adapted for coupling with at least a portion of the flexible tether 22. The node 42 may include at least one flexible coupling section 44 for engagement with a segmented section 22A of the flexible tether 22. In one embodiment, the node may include a female coupling section 46 adapted to receive a male portion 48 of the segmented section 22A therein. In another embodiment, the node may include a male coupling section 50 adapted for receipt within a female portion 52 of the segmented section 22A. At least one of the female coupling section 46 and the male coupling section 50 may include at least one engagement pins 54 for securing the node 42 with the flexible tether 22. The flexible coupling section 44 allows for the flexible attachment of the node 42 and the flexible tether 22. In one embodiment, the connected flexible coupling section 44 permits the node 42 to bend over a radius of six inches or less with respect to a portion of the flexible tether 22. The flexible coupling section 44 may be made of any suitable material, such as rubber, polyurethane or polyethylene. In a further embodiment, the flexible coupling section 44 forms a substantially water-impervious barrier with the flexible tether 22.

In one embodiment, each flexible coupling section 44 is connected to a node strength member 56 for providing high tensile strength. The node strength member 56 may be made of an electrically conductive material, or may at least partially surround an electrically conductive support material 58. In one embodiment, the node strength member 56 and/or the support material 58 is a Kevlar-reinforced cable. The node strength member 56 and/or the support material 58 may be electrically connected to the sensor 24. The strength member and/or support material 58 may also be electrically connected to the flexible coupling section 44 such that a sensor position factor detected by the sensor 24 may be electrically transmitted through the node 42. In another embodiment, the node 42 may include at least one, such as a plurality of, flexible sections 60 which provide for sufficient bending compliance such that a node 42 having a sensor 24 embedded within a tether 22, as shown in FIG. 1, may be wound on a winch or other conventionally known tether management system.

In one embodiment, the sensor 24 is provided in signal communication with a communication device 62 for transmitting the sensor position factor detected by the sensor 24 to a signal processor 38, shown in FIG. 1 and discussed elsewhere herein. The communication device 62 is adapted to transmit the sensor position factor from the sensor 24. The signal communication device 62 may include a circuit orientation board disposed within at least a portion of the node 42 and provided in electrical communication with the sensor 24. In this configuration, a sensor position factor detected by the sensor 24 may be communicated to the circuit orientation board of the signal communication device 62 and transmitted through the node 42. As shown in FIG. 2, the flexible tether 22 may define a conduit 36 therethrough. In this configuration, electrical wires may be provided within the conduit 36 and extending along the longitudinal axis of the flexible tether 22. The electrical wires may be provided in electrical communication with the node 42, such as through the flexible coupling sections 44, thereby allowing a sensor position factor detected by a sensor 24 to be communicated along and/or through the flexible tether 22. Alternatively, the communication device 62 may include a means for broadcasting the signal position factor to a signal processor 64, shown in FIG. 9, that is located at a position remote from the flexible tether 22. Each sensor 24 of the present invention may be provided within a node 42 and coupled with a communication device 62 for transmitting a detected sensor position factor from the sensor 24.

Figure 3A:
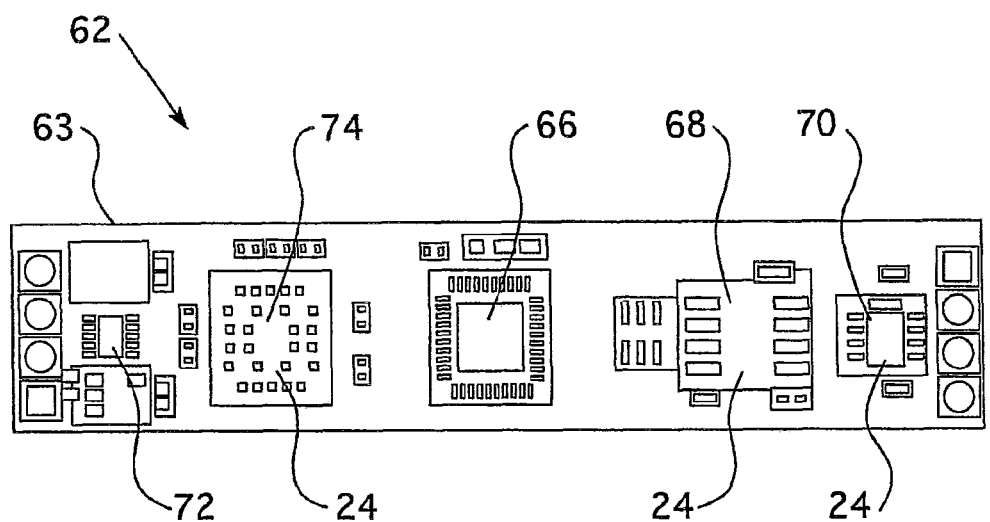
FIG. 3A is a schematic top view of an orientation board having a communication device and plurality of sensors in accordance with an embodiment of the present invention.
Figure 3B:
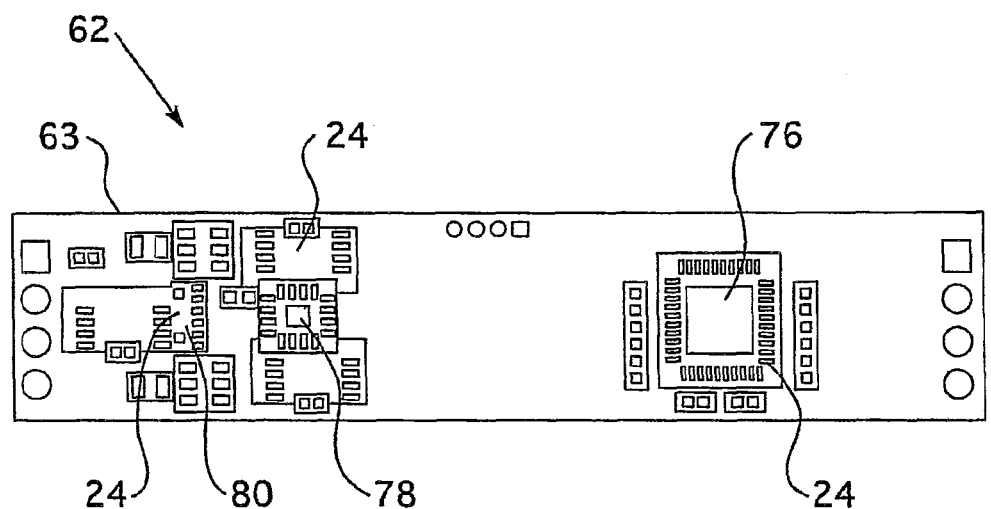
FIG. 3B is a schematic bottom view of the orientation board of FIG. 3A in accordance with an embodiment of the present invention.

Referring to FIGS. 3A and 3B, an example orientation board 63 having a communication device 62 coupled to a plurality of sensors 24 is shown. The orientation board 63 which may be affixed or otherwise embedded within the flexible tether 22 and/or node 42. The sensor 24 and communication device 62 forms the primary means of sensor input data for the position sensing system 20. The position sensing system 20 may include one or several orientation boards 63 at various points along the flexible tether 22. In one embodiment, as shown in FIG. 3A, the communication device 62 includes a microprocessor 66 adapted to read, process and/or communicate sensor data, such a detected sensor position factor from a single or multiple sensors, shown in FIGS. 1-2A. The communication device 62 may also include a transmitter 72 as shown in FIG. 2, such as a communication protocol modem, for transmitting the detected sensor position factor from the sensor 24, or multiple sensors 24.

Referring yet again to FIGS. 3A and 3B, sensors 24, such as a pressure sensor 68, an X-Y-Z accelerometer 70, a Z-Rate gyroscope 74, an X-Y Rate gyroscope 76, an X-Y magnetometer 78, and a Z magnetometer 80, may be provided in electrical communication with the microprocessor 66 to determine, detect and communicate the sensor position factor, such as the depth or angular orientation of the tether at a particular location. In certain situations, external factors may prove to provide unreliable sensor position factor data. For example, digital magnetometers may not be usable in situations where the magnetic field is unreliable. In such cases, an inertial rate sensor, such as a rate gyroscope, may be set to a reference orientation and used to compute the orientation of the sensor (example sensor position factor) for a period of time.

In one embodiment, multiple sensors 24 mutually provide sufficient data to compute the sensor position factor relative to the Earth fixed frame of reference. In one embodiment, a pressure sensor 24 may also be provided on the orientation board 63, which receives external pressure and provides for the capability of measuring depth by measuring the water (or other fluid) pressure.

Once the sensor position factor is detected by the sensor 24, it is converted into electrical signals which may be either transmitted along the tether, such as along a communication cable, remotely broadcast to a remote signal processor (shown in FIG. 1), transmitted along a communication line integrated into the tether, or transmitted along a communication line running parallel to the tether.

Figure 4:
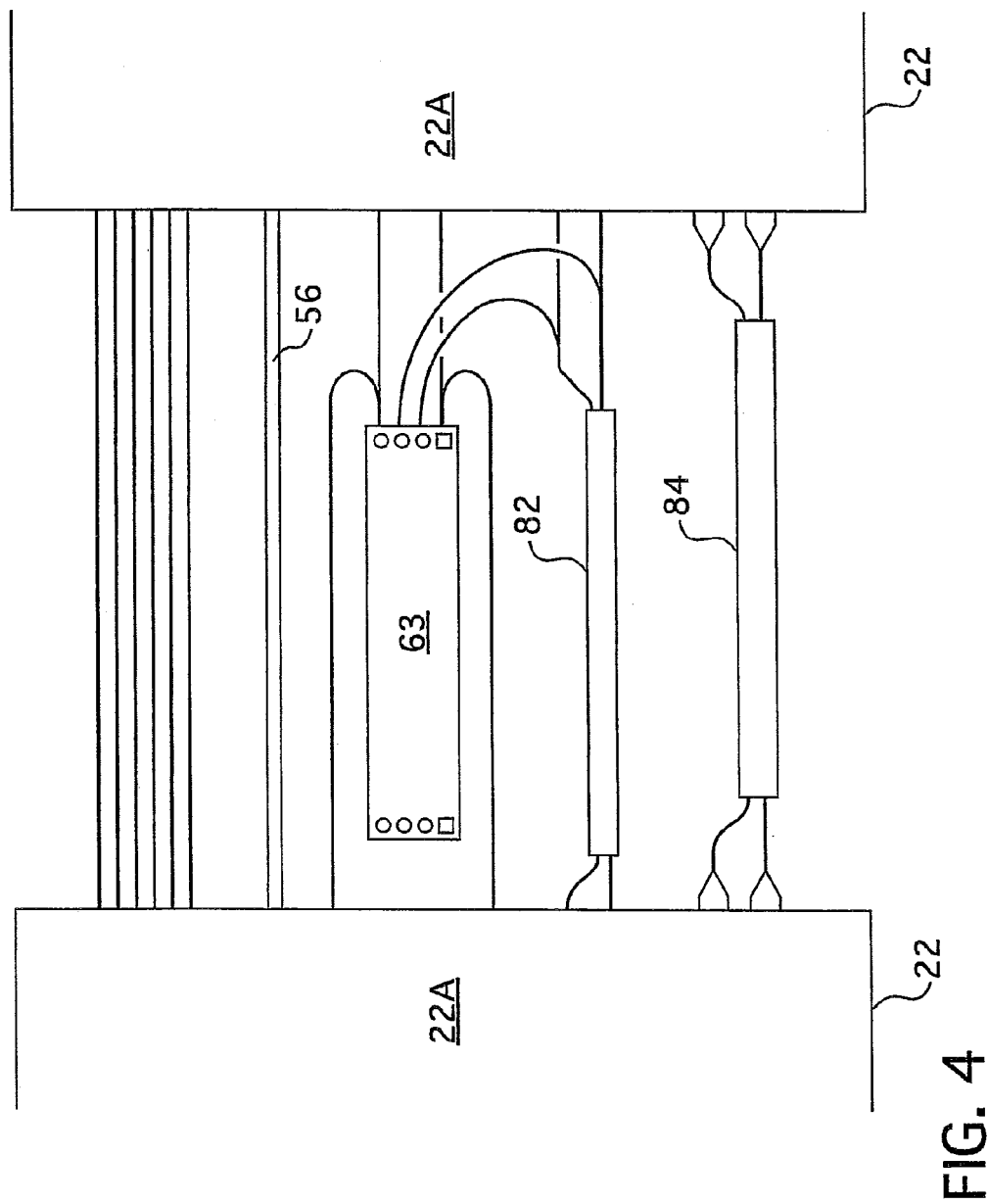
FIG. 4 is a schematic representation of an orientation board in electrical communication with a portion of the flexible tether in accordance with an embodiment of the present invention.

Referring to FIG. 4, a first segmented section 22A and a second segmented section 22A of the flexible tether 22 are shown. In this embodiment, a strength member 56 is affixed substantially parallel to an orientation board 63 within the flexible tether 22 to ensure sufficient strength of the flexible tether 22. An orientation board 63 is shown in electrical connection with a plurality of wires, such as coax 82 and coax 84. In this embodiment two wires are used to supply power and ground to the orientation board 63. Two wires are used to communicate with the sensor board via the RS-485 protocol. The remaining wires are passed by the orientation board 63 for use by the remotely operated vehicle. These remaining wires carry the high-voltage, high-current power to the probe, as well as low-current signals for control of various features such as thrusters, lights, and cameras. The high-current power line passes through the shielded coaxial line such that it does not induce a magnetic field on the circuit board that would skew the reading of the magnetometers.

Figure 5:
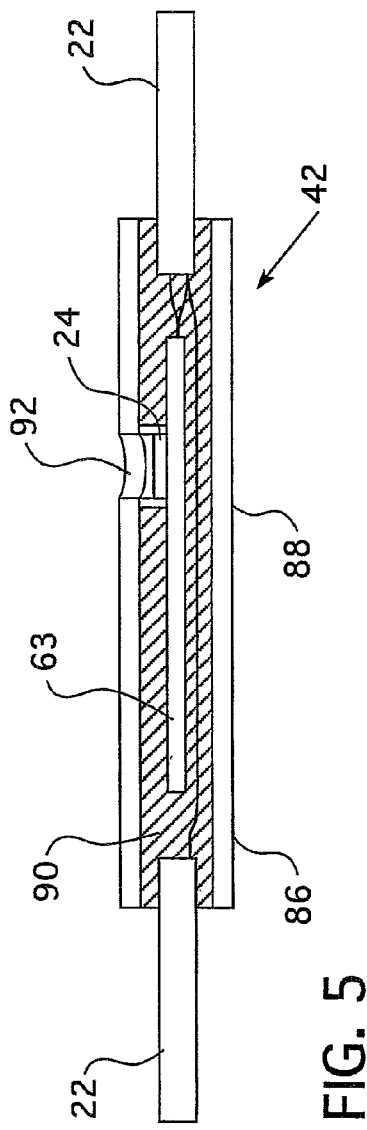
FIG. 5 is a cross-sectional side view of a sensor unit coupled to the flexible tether in accordance with an embodiment of the present invention.

Referring to FIG. 5, the node 42 may include connection to the flexible tether 22. In this configuration, the orientation board 63 may be encased within a protective housing 86 to limit the sensors and orientation board 63 from outside loads, forces and shocks. In one embodiment, the protective housing 86 includes a shell 88 filled with a protective substance 90. In one embodiment, the shell 88 may be a hard acrylic tube structure, and the protective substance may be a hard epoxy resin. In a further embodiment, the epoxy resin may provide an opening 92 sealed around a sensor 24, such as a pressure sensor, to allow the sensor 24 to receive environmental pressure from outside the node 42.

Figure 6:
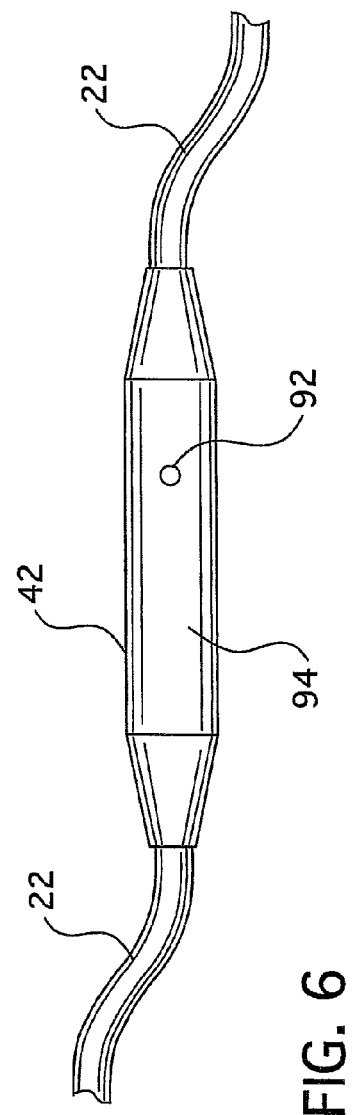
FIG. 6 is a side view of the sensor unit coupled to the flexible tether of FIG. 5 in accordance with an embodiment of the present invention.

Referring to FIG. 6, the node 42, including the orientation board 63 shown in FIGS. 4-5, and sensor(s) 24, may be encased in a protective casting 94. In one embodiment, the protective casting is a rubber casting 94, such as a substantially waterproof casting. The protective casting 94 is intended to protect the sensor(s) 24 and orientation board 63 while allowing for sufficient flexibility in the node 42. In a further embodiment, the opening 92 may be provided through the protective casting 94 to allow the adjacent sensor 24, as described above, to receive environmental pressure from outside the node 42.

Figure 7:
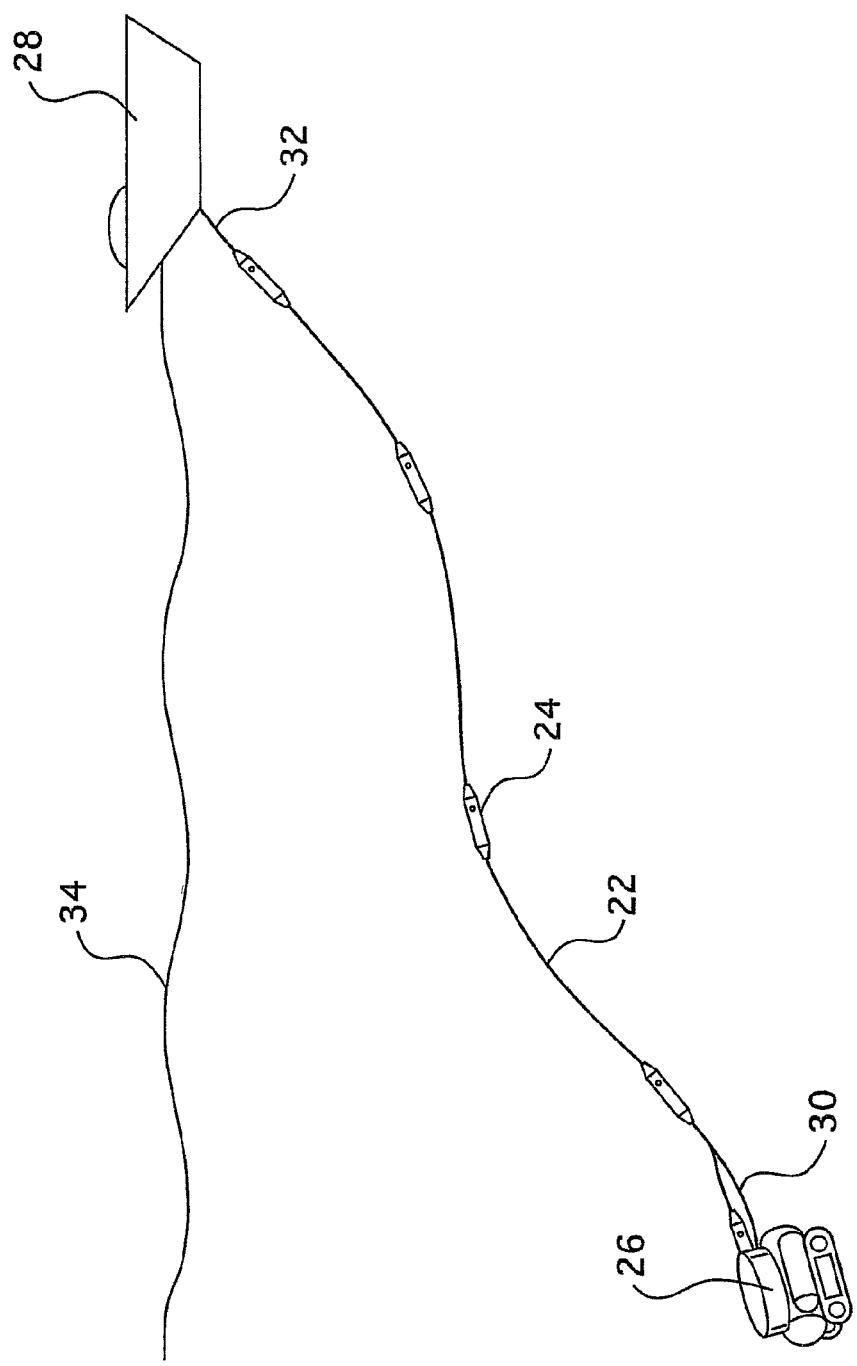
FIG. 7 is a schematic representation of the position sensing system in accordance with an embodiment of the present invention.
Figure 8:
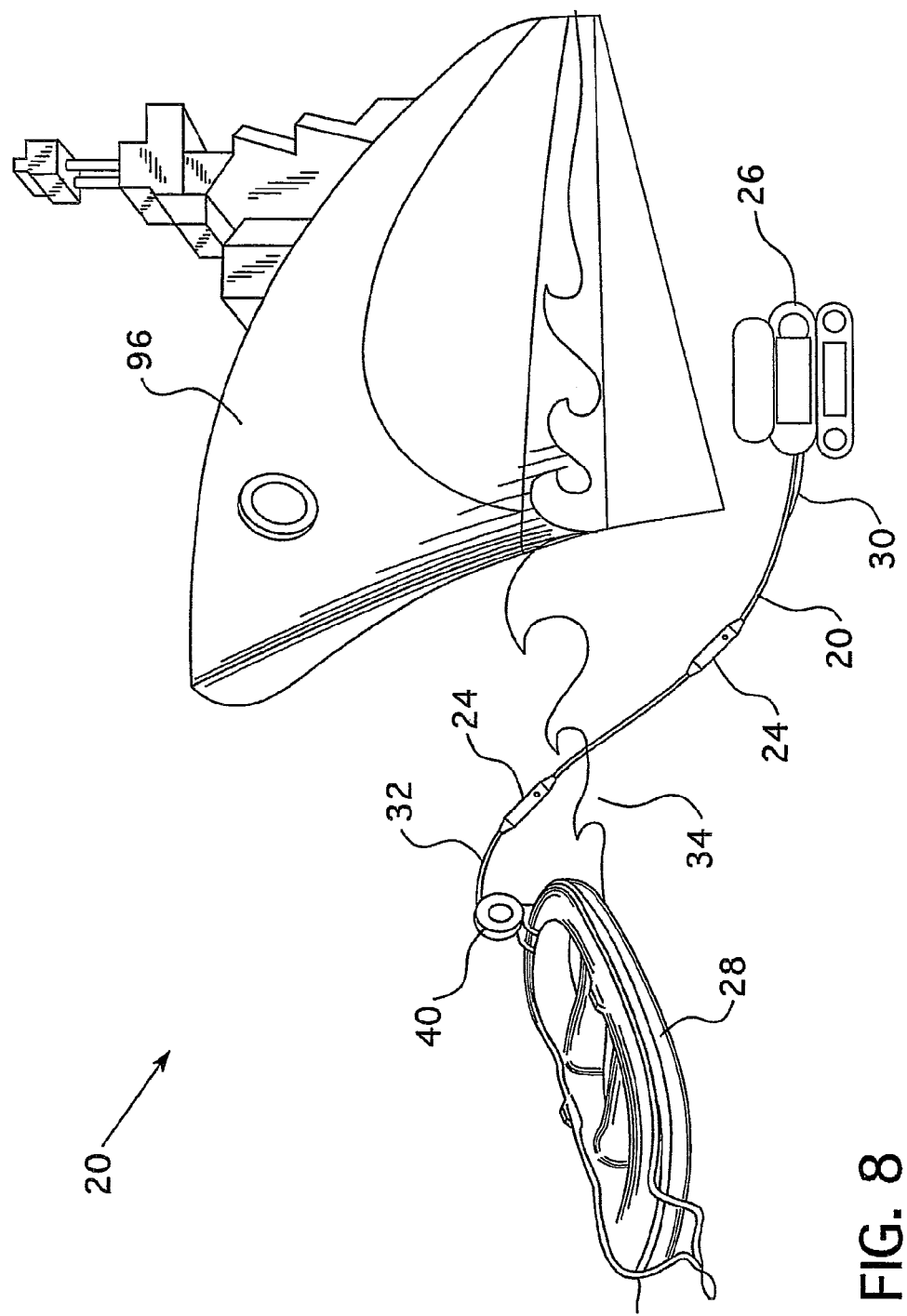
FIG. 8 is a is a schematic representation of a position sensing system including a probe, a flexible tether, a plurality of sensors embedded within the flexible tether, a portable analysis platform, and a target inspection unit in accordance with an embodiment of the present invention.

Referring to FIGS. 7-8, a probe 26 or equipment related to the probe 26 may be connected to a portion of the flexible tether 22, such as adjacent the first end 30 of the flexible tether 22. In certain configurations, the probe 26 may be adapted for complete or partial submersion below a water level 34. The probe 26 may be any suitable diagnostic device capable of remote control or direct human direction. In one embodiment, the probe 26 is adapted for operation in an aquatic environment. Example probes 26 include remotely operated vehicles (ROV), unmanned underwater vehicles (UUV), drones, human underwater divers, autonomous underwater vehicles, and submerged crawling vehicles. The probe 26 may be capable of capturing photographs, performing diagnostics and/or forensic tests, detecting the presence of selected materials, such as explosives or other incendiaries, and the like.

As shown in FIG. 8, the probe 26 may be positioned under a structure 96, such as a ship, boat, barge, pier, dock, flotilla, and the like, that is the intended object of a visual and/or other diagnostic documentation. Alternatively, the probe 26 may be adapted for patrolling open waters of bottom surfaces of bodies of water for search and rescue operations.

Referring yet again to FIGS. 7-8, in a further embodiment, the flexible tether 22 may also be connected to an analysis platform 28, such as adjacent a second end 32 of the flexible tether 22. In one embodiment, the analysis platform 28 may be adapted for positioning above the water level 34. In another embodiment, the probe 26 and the analysis platform 28 may both be partially or completely positioned below a water level 34. Optionally, the analysis platform 28 may be positioned within a ship, boat, submarine, or other aquatic vessel, docked on land, or otherwise moored to a shoreline. In a further embodiment, the analysis platform 28 may be positioned on or within the structure 96 that is the intended object of a visual and/or other diagnostic documentation.

Figure 9:
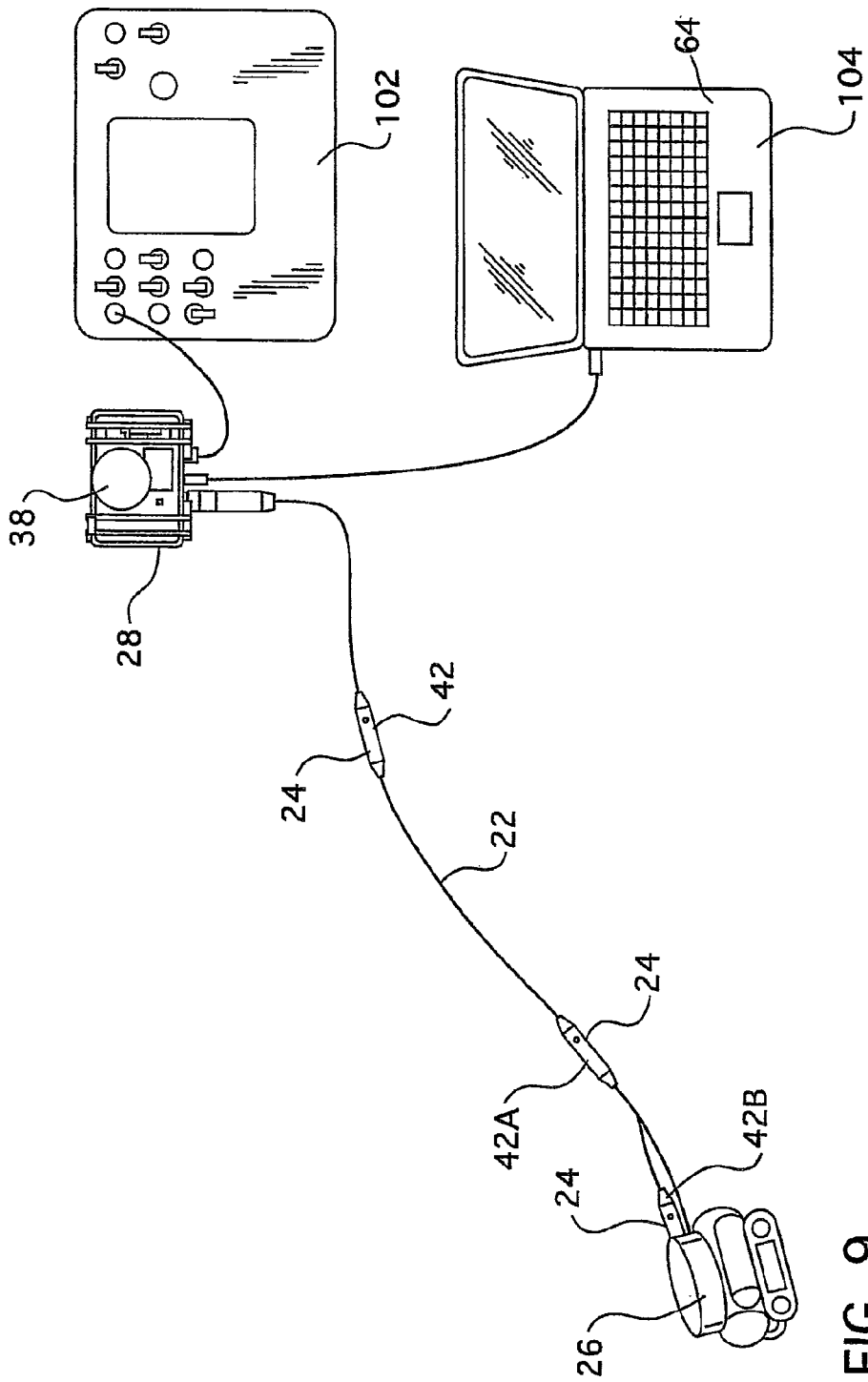
FIG. 9 is a schematic representation of a position sensing system including a probe, a flexible tether, a plurality of sensors embedded within the flexible tether, and a portable analysis platform in accordance with an embodiment of the present invention.

As shown in FIG. 8, the analysis platform 28 may include an anchoring portion 40 for securing the flexible tether 22. As shown in FIG. 9, the analysis platform 28 may include a signal processor 38 adapted to receive the sensor position factor detected by the sensor 24 and communicated from the communication device 62, shown in FIGS. 2 and 3A-3B. The signal processor 38 may be positioned above the water level and can alternatively be located on a small boat, the deck of a ship, a fixed point on the land, on a pier, or on a floating platform. As shown in FIG. 9, in one embodiment, the flexible tether 22 is also coupled to a probe 26 and the analysis platform 28 may also be adapted to steer or otherwise direct the probe 26 by means of a probe control panel 102. In a further embodiment, the analysis platform 28 includes a conventional user interface 104 adapted for both display of information pertaining to the probe 26, and information pertaining to the received sensor position factors.

In one embodiment, a single sensor 24 may be embedded within the flexible tether 22, therefore a single signal position factor may be received by the analysis platform 28. In another embodiment, a plurality of sensors 24 may be embedded within the flexible tether 22, therefore a plurality of signal position factors may be received by the analysis platform 28. In a particular embodiment, the node 42A closest to the probe 26 is separated from the probe 26 a distance of from about 2 feet to about 8 feet, such as about 5 feet. In another embodiment, an additional node 42B is located within or adjacent to the probe 26. In yet another embodiment, the remaining nodes 42 are embedded within the flexible tether 22 at intervals of about 15 feet to 30 feet.

Referring once again to FIG. 9, the analysis platform 28 may include electrical connections to supply power and data communications to the probe 26 and/or tether 22. In one embodiment, a power converter that supplies the necessary low-voltage DC power supply to the sensor boards may be utilized, as is conventionally known. Wet-mating connectors to maintain waterproof electrical connections to the probe controls, or other display equipment may also be utilized as is also conventionally known.

Referring yet again to FIG. 9, the signal processor 38 of the present invention is adapted to calculate at least one of the shape or orientation of the flexible tether 22 from the sensor position factor detected by the sensor, communicated by the communication device 62, shown in FIGS. 2 and 3A-3B, and received by the signal processor 38. Using the plurality of sensor position factors detected by the sensors, such as the accelerometer, magnetometer, angular rate gyroscope, and pressure sensor readings, the orientation and shape of the flexible tether 22 can be determined at each node 42 position. Specifically, the signal processor calculates and outputs depth data and orientation (compass angle and angle of elevation) data via serial communication with the sensors 24 and conventional user interface 104.

In one embodiment, the signal processor 38 polls the entire array of sensors 24 for current sensor position factors, and then performs a pre-determined algorithm, which is determined by application or tether specifics. Example tether specifics include tether buoyancy, number of sensors embedded within the tether, probe type, and the like. The signal processor 38 may poll the sensors 24 and perform the pre-determined algorithm several times per second. The sensor position factors received from the sensors, along with the pre-determined length spacing between the sensors is used to compute the shape of the tether 22.

Figure 9A:
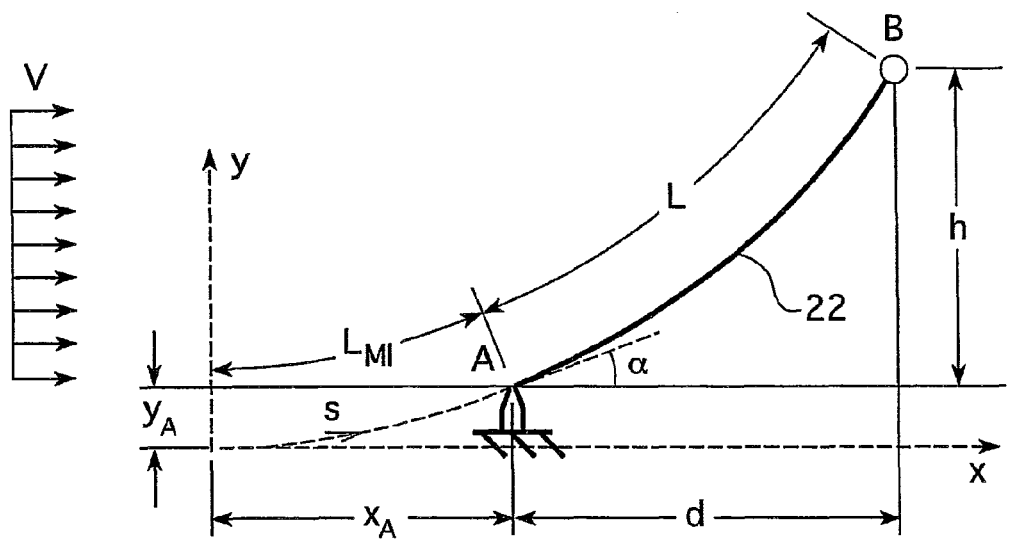
FIG. 9A is a graphical representation of a tether diagram in accordance with an embodiment of the present invention.

With reference to FIG. 9A, the signal processor shown in FIG. 1, predicts the distance between two points of interest on the tether 22 (A and B) using only a single sensor placed at point A. Angle α, the tether 22 length L, and the depth h are all measured sensor position factor values. Assuming the tether lies in a vertical plane, i.e., it is loaded only by its own weight or buoyancy, the model uses the measured inputs α, L, and h to predict the output d. The signal processor then utilizes a "phantom" tether portion to reach the origin, which is located at the point of zero slope, and orients the coordinate axes as shown for convenience. The sensor is located at some known point along the length of the tether and provides fixed measurements of depth and angle of inclination. The equations describing the catenary curve in this coordinate frame are:

$$y(x) = \frac{T_o}{\mu}\left[\cosh\left(\frac{\mu x}{T_o}\right) - 1\right] \quad (1)$$

$$s(x) = \frac{T_o}{\mu}\sinh\left(\frac{\mu x}{T_o}\right) \quad (2)$$

$$\tan\alpha = \sinh\left(\frac{\mu x}{T_o}\right) \quad (3)$$

Equations 1 and 2 are applied to points A and B, and the slope equation 3 is applied at point A. By substituting $K_t = T_o/\mu$, the dependency on the tether's material properties is eliminated. Thus, $$y_A = K_t\left[\cosh\left(\frac{x_A}{K_t}\right) - 1\right] \quad (4)$$

-continued $$y_A + h = K_t\left[\cosh\left(\frac{x_A + d}{K_t}\right) - 1\right] \quad (5)$$

$$L_{PH} = K_T\sinh\left(\frac{x_A}{K_T}\right) \quad (6)$$

$$L_{PH} + L = K_T\sinh\left(\frac{x_A + d}{K_T}\right) \quad (7)$$

$$\tan\alpha = \sinh\left(\frac{x_A}{K_t}\right) \quad (8)$$

This provides 5 equations in terms of the 5 unknowns $K_t$, $x_A$, $y_A$, d, and $L_{PH}$, with inputs of the tether length and the depth and angle of inclination of the sensor. $x_A$, $y_A$, and $L_{PH}$ represent the height, horizontal distance, and tether length from the sensor location to the point of zero slope on the tether shape, and d is the horizontal distance of interest. The parameter $K_t$ may be found from the inputs as follows:

$$K_t = \frac{-L^2 + h^2}{2(h\sqrt{\tan^2\alpha + 1} - L\tan\alpha)} \quad (9)$$

Next, various nondimensional values can be found:

$$h^* = \frac{h}{K_t} \quad L^* = \frac{L}{K_t} \quad L_{PH} = \tan\alpha \quad x_A^* = \sinh^{-1}(\tan\alpha) \quad (10)$$

Finally, the horizontal distance between the tether ends can be found:

$$d = K_t(\sinh^{-1}(L^* + L_{PH}^*) - x_A^*) \quad (11)$$

Alternatively, in the case of multiple sensors embedded within a tether, the signal processor utilizes each pair of adjacent sensors form a tether "segment". The shape of each segment is found using a curve-fitting routine based on the sensor information. Once the shape of each segment is found, all of the segments are added together in order to form the total tether shape.

Figure 9B:
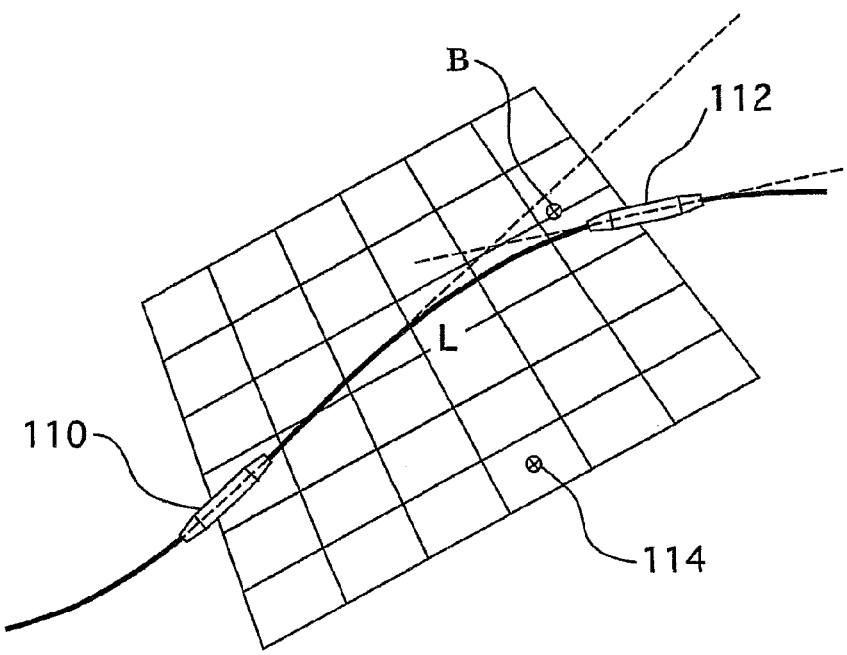
FIG. 9B is a graphical representation of a tether segment calculation in accordance with an embodiment of the present invention.

As shown in FIG. 9B, a calculation is made using the angle and depth information from sensors 110 and 112 to find a plane 114 which contains both sensors 110, 112. Next, the angle β between the sensors 110, 112 is found. Given this angle and the known tether length L between the sensors 110, 112, the radius of the arc fit between the two sensors can be determined using the equation:

$$r = \frac{L}{\beta} \quad (12)$$

Once the radius of the arc is found, a circular arc is plotted between the two sensors 110, 112, and then that arc is simply transformed from the local coordinates of the sensor pair plane into global earth-fixed, latitude-longitude coordinates. The signal processor may directly perform the above-identified calculations or, may utilize a computer readable medium having instructions for executing the above-identified calculations stored thereon. In one embodiment, the sensors 24 and signal processor 38 may update the tether position on the order of 10-30 Hz, which is significant as compared to existing acoustic systems, which are on the order of 0.5-1.0 Hz.

Figure 10:
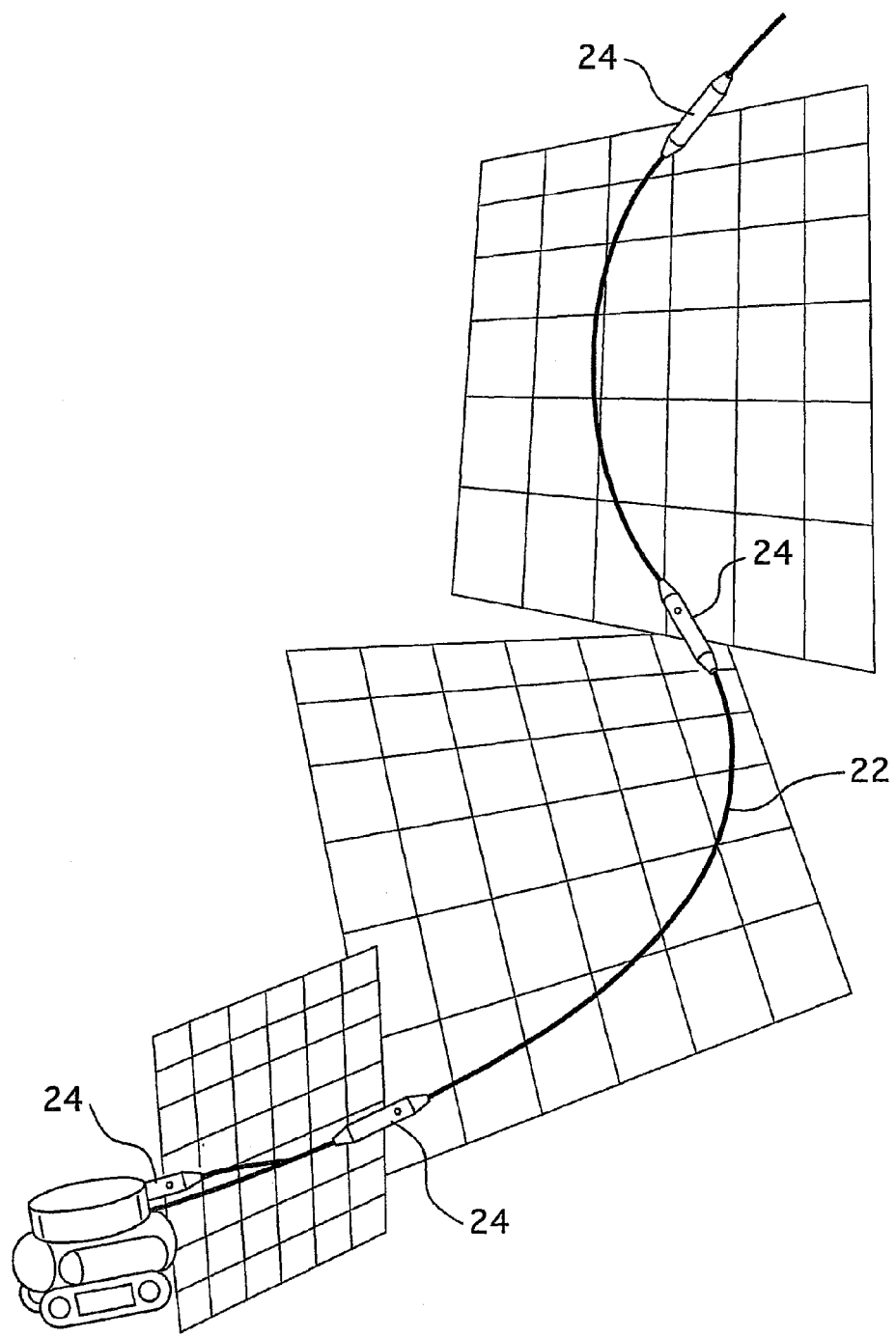
FIG. 10 is a schematic representation of the curvature of a flexible tether calculated from a sensor position factor transmitted from a sensor embedded within the flexible tether in accordance with an embodiment of the present invention.

As shown in FIG. 10, the shape and orientation of a tether 22 having multiple curvatures may be determined using the position sensing system 20 of the present invention. In one embodiment, at least one sensor 24 is embedded within the flexible tether 22 for each expected curvature of the tether 22, plus one additional sensor 24. Accordingly, if a tether 22 may be expected to have two curvatures or inflection points, the flexible tether 22 should contain at least three sensors 24. Accordingly, the plurality of sensor position factors detected by the sensors, and received by the signal processor, are capable of indicating at least one of the shape or orientation of the flexible tether 22. The shape or orientation of the flexible tether 22 may be determined from two adjacent sensors 24 embedded within the flexible tether 22. Alternatively, the shape or orientation of the flexible tether 22 may be determined by multiple sensor position factors received from multiple sensors 24 embedded within the flexible tether 22.

Once the shape or orientation of the flexible tether 22 is accurately determined, the signal processor may utilize at least one of the shape or orientation of the flexible tether 22 to navigate or locate the probe 26. Accordingly, the received sensor position factors may be used to determine the precise location of a probe 26 in an underwater environment in which visual confirmation of location is not possible and magnetic field distortions are common.

Figure 11:
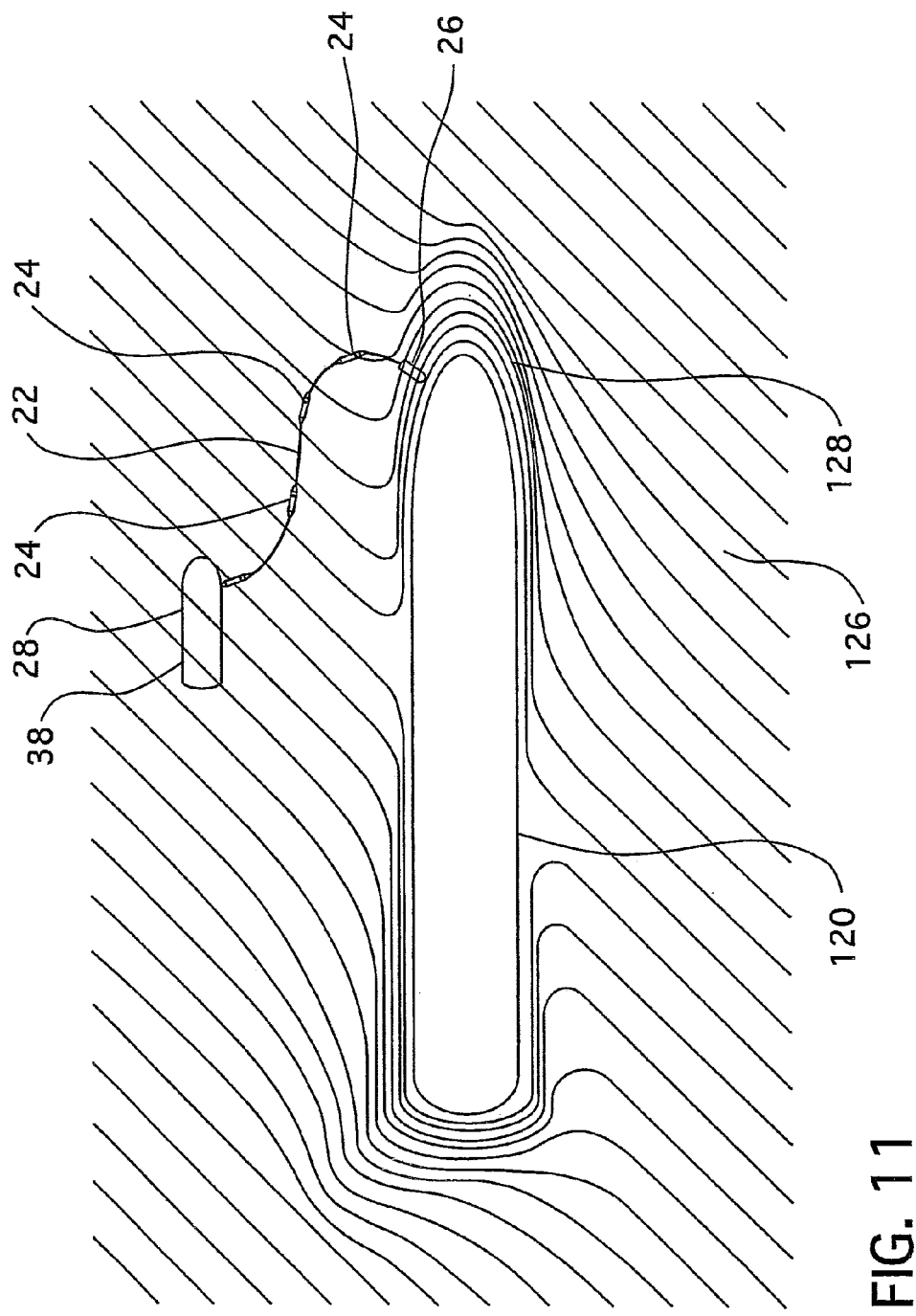
FIG. 11 is a schematic representation of a position sensing system performing an underwater search of a ship hull in accordance with an embodiment of the present invention.

As shown in FIG. 11, a probe 26, such as an inspection ROV is connected to a flexible tether having multiple sensors 24 embedded within the flexible tether 22. In this embodiment, the probe 26 may be used to search on and around the hull of a ship 120, for military or homeland security purposes such as to search for drugs, mines and other illegal objects. As shown in FIG. 11, a normal magnetic field 126 is observed at locations spaced significantly from the ship 120, however, significant magnetic field distortions 128 are observed in close proximity to the ship 120. The sensor position factors of the present invention may be processed by the signal processor 38 of the analysis platform 28 to compensate for distortions or magnetic fields and other perturbations to accurately calculate the shape or orientation of the flexible tether 22. Additionally, the probe 26 may be adapted to document the location of particular sensed objects or to document the precise location of cracks, corrosion, damage or other important features of the ship hull as determined by the accurate location of the probe 26.

Figure 12:
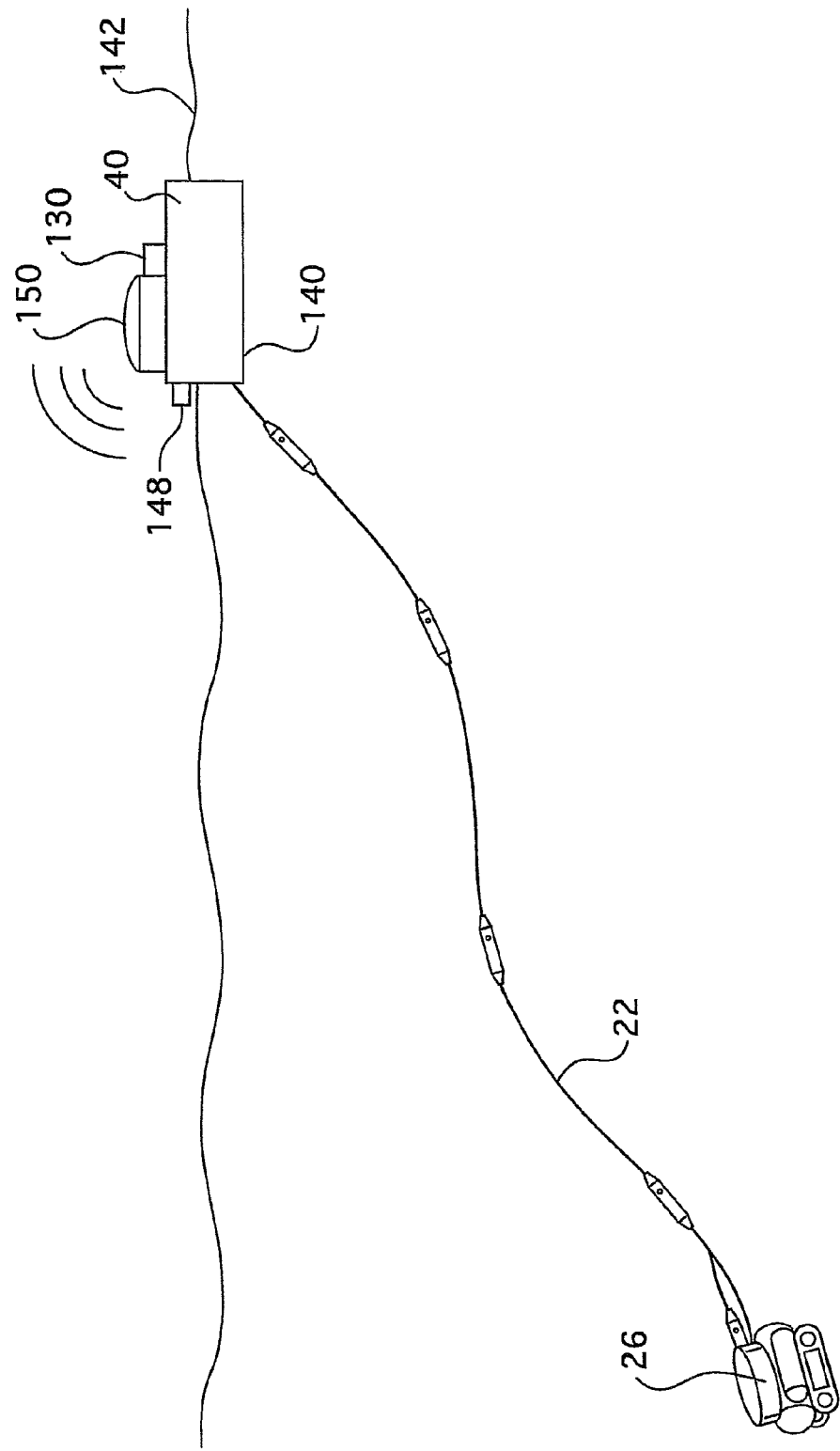
FIG. 12 is a schematic representation of a position sensing system having a topside floating platform in accordance with an embodiment of the present invention.

As shown in FIG. 12, in a further embodiment, a Global Positioning System (GPS) receiver 130 may be positioned adjacent the anchoring portion 40 of the flexible tether 22. The position sensing system 20 of the present invention may calculate the global underwater position and depth of the probe 26 by calculating the position relative to the GPS receiver 130. In this configuration, the tether 22 may be connected to a floating platform 140. Optionally, the probe 26 may be fitted with propulsion mechanisms (not shown) enabling the floating platform 140 to be dragged along the surface of the water 142, thereby enabling greater mobility and range of the system. The floating platform 140 may be equipped with a winch, not shown but as conventionally known, to deploy and retract the tether 22. In one configuration, a sensor 148 may be included to measure how much tether length is deployed at any one time. In such a configuration, the probe 26 can be controlled remotely via wireless communications to an antenna 150 on the floating platform 140. In such an embodiment, the remote operator may navigate the probe 26 as if it were receiving GPS navigation data underwater.

Figure 12A:
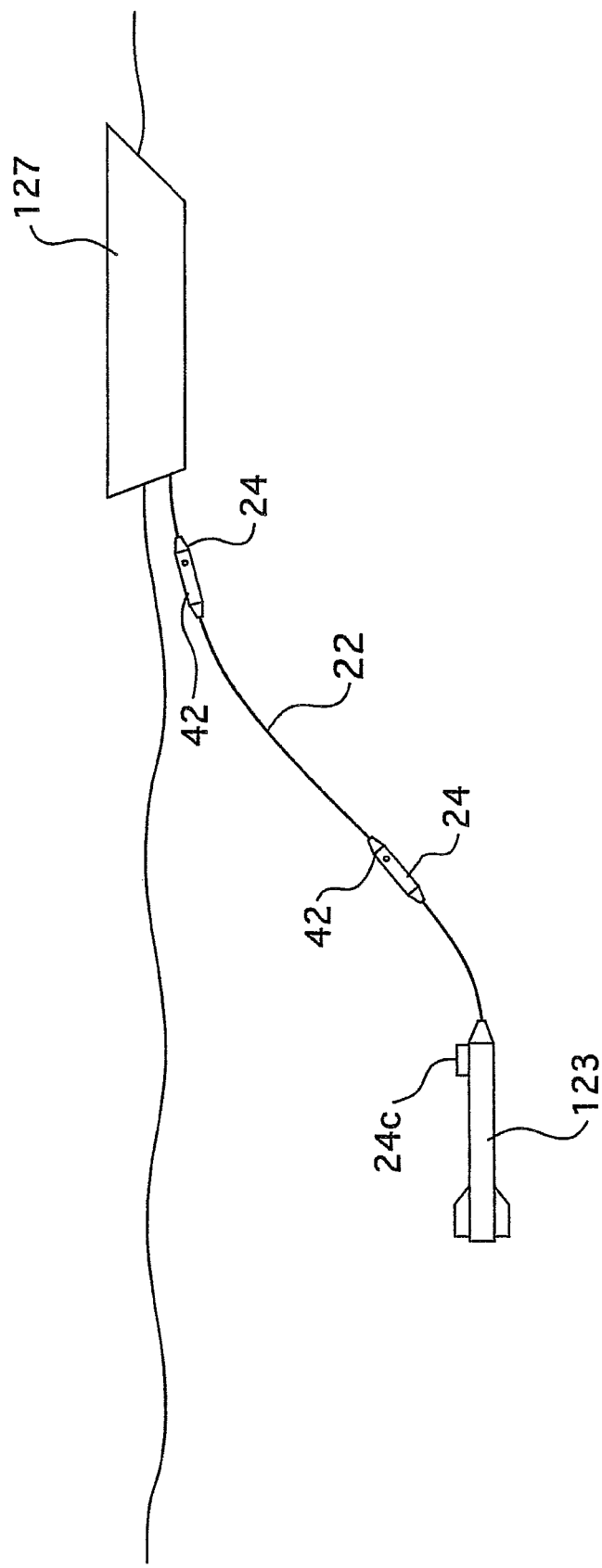
FIG. 12A is a schematic representation of a position sensing system having an underwater sensor platform, a flexible tether having a plurality of sensors embedded within the flexible tether, and a surface water vehicle in accordance with an embodiment of the present invention.

Alternatively, as shown in FIG. 12A, the flexible tether 22 may be used to calculate the underwater position of an underwater sensor platform 123 towed behind a surface water vehicle 127. This type of towed underwater sensor platform 123 is typically referred to as a towfish. In this embodiment, one or two sensors 24 and/or nodes 42 would typically be embedded within the tether 22, near the underwater sensor platform 123. Additionally, a sensor 24C may be mounted on or adjacent the underwater sensor platform 123 to provide orientation and depth measurements directly. In this embodiment, the position sensing system 20 may provide accurate GPS location data for a towed underwater sensor 24, such as a side-scan SONAR or magnetometer sensor, both of which are used to search for sunken ships and other submerged objects on the seafloor, such as mines. In this configuration, the position sensing system 20 would enable a far more accurate estimation of the underwater sensor position, especially in an environment with ocean currents or when the towing vehicle is turning or changing direction.

Figure 13:
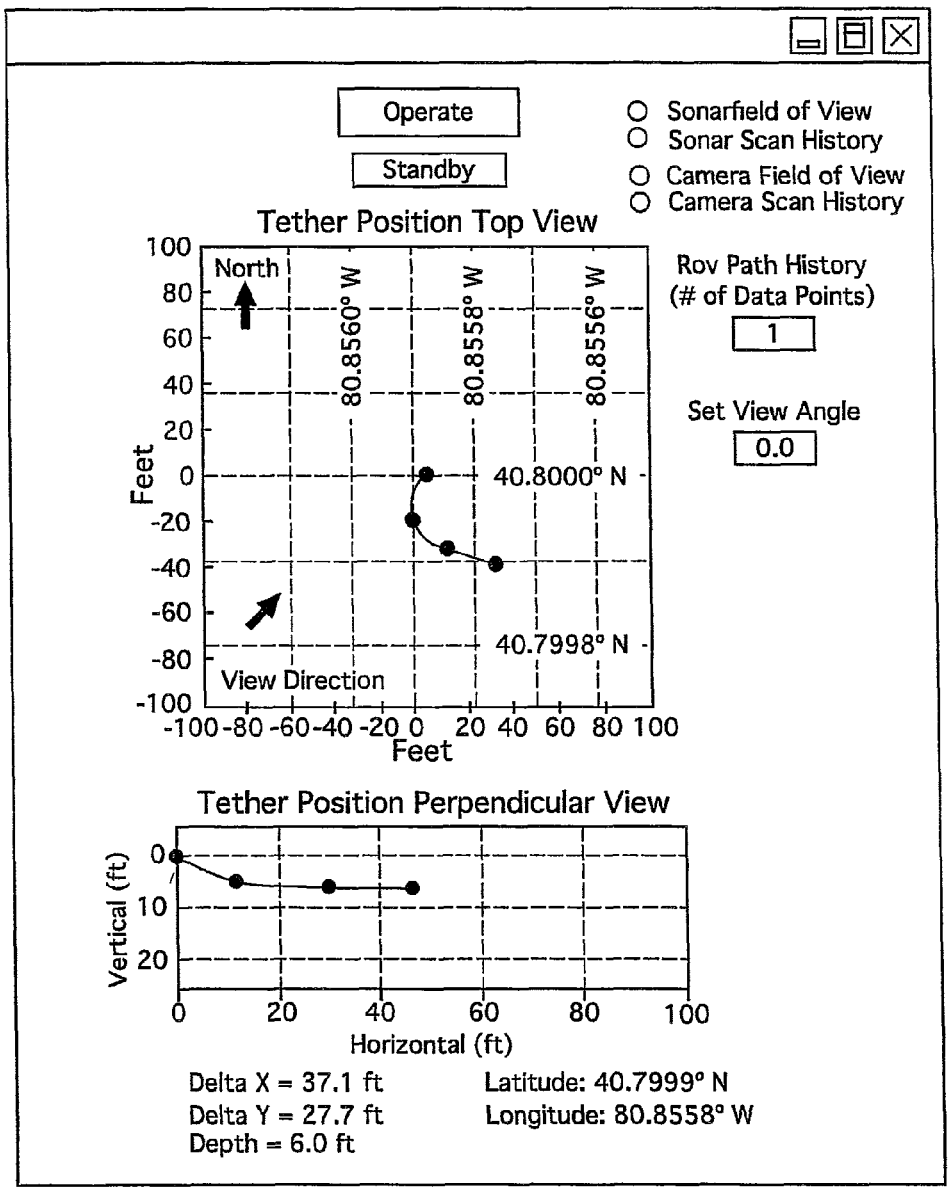
FIG. 13 is a schematic representation of a graphical interface associated with a signal processor of the position sensing system showing the shape and orientation of the flexible tether in accordance with an embodiment of the present invention.

Referring again to FIG. 9, optionally the conventional user interface 104 of the analysis platform 28 may include a graphical user interface (GUI). This GUI may visually depict the shape and/or orientation of the tether 22 as determined by the signal processor 38 and the received sensor position factors. The GUI may provide a plurality of different views of the tether 22, such as shown in FIG. 13. Optionally, a top view, a side view, a rear view, and/or a 3-dimensional view of the tether 22 may be displayed. In one embodiment, the GUI displays the shape of the tether in a top view and side view. In yet another embodiment, the GUI provides for the user to input a desired view angle such that the tether 22 and the probe are plotted at the desired orientation. In addition, other functions can be employed to calculate the shape and orientation of the entire multi-section tether such as polynomial curve fitting, dynamic models, finite element models of the tether, and flow-induced models of the tether dynamics, each of which may be displayed in a user-customizable format.

In another embodiment, a confidence indicator may be included in the user-display to estimate the expected accuracy of the position sensing system 20. The confidence indicator may utilize sensor position factors detected at each sensor to estimate how taut the tether is. A tighter tether 22 is estimated to have greater accuracy. The sensors 24 may optionally perform an accuracy self-assessment which is displayed as the confidence indicator. The accuracy that can be achieved is of the order of 0.5 meter to 1.5 meters or about 2-5% of the tether length.

Optionally, a nautical chart or map can be incorporated into the GUI such that the tether and the probe locations are plotted on the map as an absolute reference frame. In another embodiment, the tether plots can be shown in alternative views and angles, including three-dimensional plots. Other incorporations may include visual images taken from a camera or video onboard the probe, and/or forward-looking SONAR.

The present invention is faster to deploy than conventionally used acoustic transponder beacons because the system is entirely tether-based. Accordingly, the deployment time can be reduced from one or several hours required for conventional systems, to several minutes. In addition, consistent localization of the tether and/or an associated probe may be achieved with certain configurations to have an accuracy of better than 1 meter. Finally, the present system utilizes sensor position factors that rely on vector measurements, such as gravity and acceleration, to determine orientation and shape. This reliance minimizes the effect of acoustic reflections or acoustic harbor noise which are challenges to existing acoustic-based systems.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof. For example, while the present invention is implemented primarily from the point of view of conducting underwater inspections of ship hull in the described embodiments, the present invention may also be effectively implemented on, for example, but not so limited to, underwater exploration, hydrographic survey, wreck investigation, underwater recovery, site survey, installation inspection and maintenance.

The invention claimed is:

1. An underwater navigation position sensing system, comprising:
   a flexible tether;
   a plurality of sensors at least partially embedded within a portion of the flexible tether, wherein the plurality of sensors are adapted to each detect a sensor position factor, wherein the plurality of sensors are housed at least partially within a node, and wherein at least one sensor position factor is magnetic field, at least one sensor position factor is gravitational field, and at least one sensor position factor is relative pressure;
   a communication device adapted to transmit each of the sensor position factors from the plurality of sensors; and
   a signal processor adapted to receive the detected magnetic field and the detected gravitational field and to compute a three dimensional orientation of the plurality of sensors, with the signal processor also adapted to calculate the three dimensional shape of the flexible tether which is solely determined from the three dimensional orientation and the detected relative pressure.

2. The position sensing system of claim 1, wherein the plurality of sensors spaced apart from one another within the flexible tether.

3. The position sensing system of claim 1, wherein the sensor position factor also includes at least one of relative orientation, relative depth, relative pressure, presence of a magnetic field, presence of an electric field, acceleration, or relative rate of rotation.

4. The position sensing system of claim 1, wherein the sensor is at least one of an accelerometer, pressure sensor, magnetometer, or gyroscopic angular rate sensor.

5. The position sensing system of claim 1, wherein the plurality of sensors is provided in a node having at least one flexible coupling section.

6. The position sensing system of claim 1, wherein the communication device transmits the sensor position factor along the flexible tether.

7. The position sensing system of claim 1, further comprising a probe connected to at least a portion of the flexible tether, wherein the signal processor utilizes at least one of the shape or orientation of the flexible tether to navigate or locate the probe.

8. The position sensing system of claim 7, wherein the probe is at least one of a remotely operated vehicle, an unmanned underwater vehicle, a human underwater diver, an autonomous underwater vehicle, or submerged crawling vehicle.

9. The position sensing system of claim 7, wherein the probe is underwater, and a first end of the flexible tether is connected to an analysis platform located above water, and a second end of the flexible tether is connected to the probe or equipment related to the probe.

10. A position sensing system, comprising:
    a flexible tether;
    a plurality of sensors at least partially embedded within a portion of the flexible tether, wherein the plurality of sensors are adapted to each detect a sensor position factor, wherein the plurality of sensors are housed at least partially within a node, and wherein at least one sensor position factor is magnetic field, at least one sensor position factor is gravitational field, and at least one sensor position factor is relative pressure; and
    a communication device adapted to transmit each of the sensor position factors from the plurality of sensors, wherein the shape of the flexible tether is determined solely from the sensor position factors.

11. The position sensing system of claim 10, wherein the sensor position factor also includes at least one of relative orientation, relative depth, relative pressure, presence of a magnetic field, presence of an electric field, acceleration, or relative rate of rotation.

12. The position sensing system of claim 10, wherein the plurality of sensors comprise at least one of an accelerometer, pressure sensor, magnetometer, or gyroscopic angular rate sensor.

13. The position sensing system of claim 10, further comprising a probe connected to at least a portion of the flexible tether, wherein the sensor position factor determines the location of the probe.

14. The position sensing system of claim 13, wherein the probe is at least one of a remotely operated vehicle, an unmanned underwater vehicle, a human underwater diver, an autonomous underwater vehicle, or submerged crawling vehicle.

15. A method for navigating or locating a probe, comprising the steps of:
    providing a flexible tether having a plurality of sensors at least partially embedded within a portion of the flexible tether, wherein the plurality of sensors are adapted to each detect a sensor position factor, wherein the plurality of sensors are housed at least partially within a node, and wherein at least one sensor position factor is magnetic field, at least one sensor position factor is gravitational field, and at least one sensor position factor is relative pressure;
    detecting a plurality of sensor position factors;
    communicating each of the detected sensor position factors to a signal processor;
    computing a three dimensional orientation of the plurality of sensors from the detected magnetic field and the detected gravitational field; and
    calculating the shape of the flexible tether which is solely determined from the three dimensional orientation and the detected relative pressure.

16. The method for navigating or locating a probe of claim 15, further comprising a probe connected to the flexible tether, and calculating the orientation of the probe.

17. The method for navigating or locating a probe of claim 16, wherein the probe is at least one of a remotely operated vehicle, an unmanned underwater vehicle, a human underwater diver, an autonomous underwater vehicle, or submerged crawling vehicle.

18. A non-transitory computer readable medium containing computer instructions stored therein for causing a computer processor to calculate the shape of a flexible tether which is solely determined from a three dimensional orientation, calculated by a detected magnetic field and a detected gravitational field, and a detected relative pressure detected by a plurality of sensors embedded within the flexible tether and housed at least partially within a node.

\* \* \* \* \*

UNITED STATES PATENT AND TRADEMARK OFFICE
CERTIFICATE OF CORRECTION

PATENT NO. : 8,437,979 B2
APPLICATION NO. : 12/017537
DATED : May 7, 2013
INVENTOR(S) : Jeremy E. Frank et al.

It is certified that error appears in the above-identified patent and that said Letters Patent is hereby corrected as shown below:

In the Claims:

Column 13, Line 39, Claim 2, after "sensors" insert -- is --

Signed and Sealed this
Third Day of September, 2013

Teresa Stanek Rea
*Acting Director of the United States Patent and Trademark Office*